Oct. 20, 1970 J. L. FLANAGAN ET AL 3,535,473

SELF-ADJUSTING ECHO CANCELLER

Filed Oct. 31, 1966 2 Sheets-Sheet 1

INVENTORS J. L. FLANAGAN
D. W. HAGELBARGER
BY G. E. Hirsch
ATTORNEY

SELF-ADJUSTING ECHO CANCELLER

Filed Oct. 31, 1966 2 Sheets-Sheet 2

United States Patent Office 3,535,473

Patented Oct. 20, 1970

3,535,473

SELF-ADJUSTING ECHO CANCELLER

James L. Flanagan, Warren Township, Somerset County, and David W. Hagelbarger, Morris Township, Morris County, N.J., assignors to Bell Telephone Laboratories, Incorporated, Murray Hill and Berkeley Heights, N.J., a corporation of New York Filed Oct. 31, 1966, Ser. No. 590,581
Int. Cl. H04b 3/20
U.S. Cl. 179—170.2 9 Claims

ABSTRACT OF THE DISCLOSURE

An echo canceller for a long distance telephone circuit wherein a network bridging the hybrid is automatically adjusted to have the negative of the transmission characteristic of the hybrid. Incoming signals are fed both to the bridging network and to the hybrid. The output from each is combined in the outgoing circuit. The echo signal leaving the hybrid is cancelled by the bridging network output.

Figure 1:
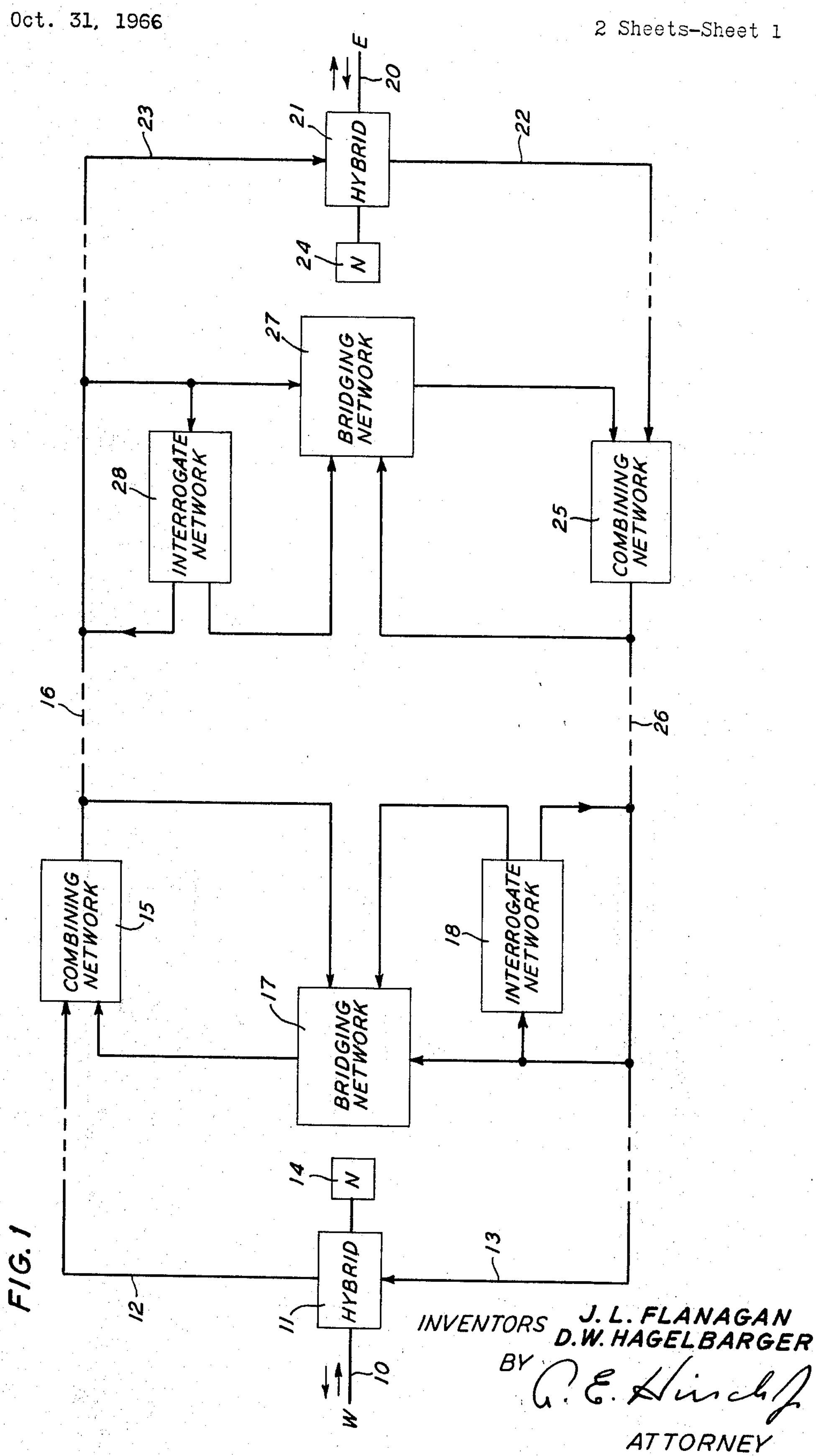

This invention relates to the suppression of echoes in communication channels and more particularly to the effective suppression of echoes in a two-way telephone circuit of extremely long length such as, for example, a circuit completed by way of a satellite repeater in orbit about the earth. Its principal object is to afford improved protection against echoes irrespective of the length of the transmission circuits in use.

Echoes occur in telephone circuits when electrical signals meet impedance discontinuities, such as imperfectly matched junctions, and are partially reflected back to the talker. Because such signals require a finite travel time, this reflected energy, or echo, is heard some time after the speech is transmitted. A common point of mismatch is at a four-wire to two-wire junction. The two-wire circuit is in most cases a subscriber loop. Its impedance can vary over a relatively broad range, but conventionally, the hybrid network employed at the junction is balanced for some average two-wire circuit impedance. Unfortunately, the hybrid network permits some of the incoming signal to reach the outgoing circuit.

An attempt is therefore generally made to control these echo signals with voice operated devices which function to disable the voice path in the outgoing direction when a signal is detected in the incoming direction. However, since the echo signal shares the outgoing channel with locally generated signals, an interruption of the outgoing circuit effectively disconnects the local subscriber from the line. Thus, such echo suppressors introduce chopping or interruptions of the local signal circuit during periods of double talking, i.e., during periods when the two speakers talk simultaneously. Chopping of this sort is more serious as round-trip delay time increases.

For circuits with extensive round-trip delay periods therefore, it is necessary to eliminate echoes by complete cancellation while, at the same time, permitting transmission in both directions. An echo-free circuit thus provided with a facility for double talking appreciably shortens talker delay, for example, between question and response or between comment and reaction, and gives both talkers a sense of conversational presence.

It is a specific object of this invention to improve the quality of speech or other communications signals transmitted over long distances by substantially eliminating echo returns without, however, impeding the free flow of conversation in both directions.

Since most of the echo signal which appears in the outgoing path of a four-wire to two-wire junction stems from hybrid unbalance, i.e., inefficient hybrid operation, one technique for improving the situation involves dynamically balancing the bybrid in accordance with circuit conditions. For example, unbalance of the hybrid network may be detected by noting the presence of an echo on the transmit side of the hybrid. The echo waveform is then processed and employed to adjust a matching network associated with the hybrid. Such a device can be adjusted to improve the hybrid match for a certain class of lines, for example, all lines having the same general configuration but variable lengths. Although an adaptive system of this sort which continuously adjusts the matching network as a direct function of echo represents an ideal solution, past attempts to implement it have been found wanting.

In accordance with the present invention, an entirely different approach is taken toward maintaining appropriate network balance. Instead of adjusting the hybrid terminating network, it is in accordance with the invention to regard the echo signal as a linearly filtered version of the incoming signal, with the hybrid network and its joining circuits, whatever their character, constituting the filter. The impulse response of the filter is measured and a bridging network is synthesized to approximate the impulse response of the filter system. Incoming signals constitute the input to the bridging network. Consequently, the output of the bridging network approximates the echo component and may be used to cancel, e.g., by algerbraic combination, the echo signal in the outgoing circuit. Effectively, echo cancellation, as opposed to mere suppression, is achieved without interrupting the outgoing signal path.

In essence, therefore, it is in accordance with the invention to compensate for hybrid or other circuit unbalance by measuring the trans-hybrid transmission of a given circuit junction and bridging the junction with a circuit that exhibits the negative of the trans-hybrid transmission. The return path echo that normally would arise from a signal entering the junction is cancelled with a signal passing through the circuit.

In a preferred form of the invention, an interrogation pulse is applied to the incoming circuit and detected as it reaches the outgoing circuit. The fixed delay associated with the trans-hybrid path is taken into account and the interrogation pulse is analyzed, for example, by means of a transversal filter system to establish the impulse response of the trans-hybrid path. Samples of a signal representative of the impulse response are then employed to adjust a bridging network, for example, a transversal filter system, connected in shunt with the hybrid junction circuit. Subsequently, incoming signals passed through the bridging network are subtracted from signals in the outgoing circuit, so that the output signal is devoid of all echo components. No break occurs in the outgoing circuit, however, so that double talking may take place even in the presence of full echo cancellation.

Preferably, the hybrid characteristic is measured during silent speech intervals. For example, the interrogation pulse may be applied to the incoming circuit of the system as soon as a connection is made but prior to the transmission of speech signals. It is possible of course for the trans-hybrid transmission characteristic to be measured at any time so that the bridging network may be readjusted periodically during speech transmission.

Figure 2:
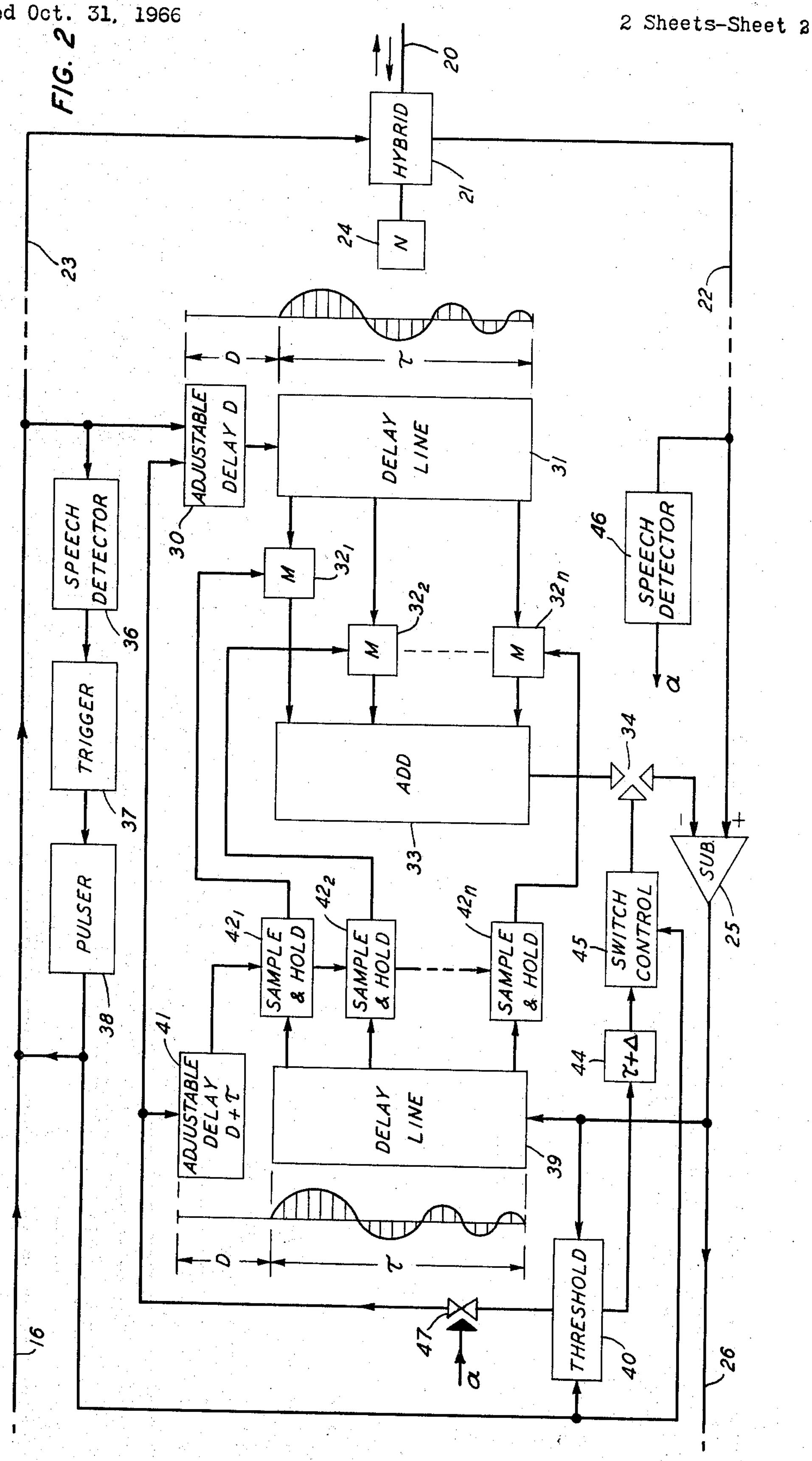

The invention will be fully apprehended from the following detailed description of an illustrative embodiment thereof taken in connection with the appended drawings in which:

FIG. 1 is a block schematic diagram showing a two-way signal transmission system which employs echo cancellation apparatus in accordance with the present invention; and FIG. 2 is a block schematic diagram showing the structural details of a portion of the system of FIG. 1.

FIG. 1 illustrates, by way of example, a signal transmission system interconnecting two terminal stations designated respectively E (east) and W (west). Two-way transmission is carried out in the following manner. A local circuit 10, which typically is a conventional two-wire telephone circuit connecting a subscriber to station W, is connected by hybrid network 11 to one end of a four-wire system that includes two separate two-wire circuits 12 and 13. In well-known fashion, the hybrid network provides a one-way path for voice currents from circuit 10 to outgoing circuit 12 and another one-way path for incoming currents from circuit 13 to local circuit 10. The impedance of the local circuit 10 is matched insofar as practical by a balancing network 14 associated with hybrid 11.

Outgoing currents in circuit 12 are passed by way of combining network 15 to the west-to-east transmission circuit 16. Circuit 16 typically includes both traditional telephone links and circuits completed by way of one or more earth satellites. At the east station currents from circuit 16 are delivered by way of circuit 23 to hybrid network 21 which, in turn, transfers the incoming currents to subscriber circuit 20 and routes locally generated signals from circuit 20 to outgoing circuit 22. Output currents are passed by way of combining network 25 to east-to-west transmission circuit 26, also generally including a satellite transmission link, to station W. Signal currents received at station W are delivered by way of circuit 13 to hybrid network 11. Circuits 12 and 13 at the west station and circuits 22 and 23 at the east station may be of considerable length; they may represent any linear connecting circuit. Thus, the associated hybrid junctions may be located at terminal stations considerably removed from the combining networks 15 and 25 and the associated networks. The dashed indications in these circuits denote the possible spatial separation.

Ideally, all incoming currents are passed to the subscriber line; none is transferred to the outgoing circuit. Unfortunately, hybrid networks permit some of the incoming signal to reach the outgoing circuit. This signal is classified as an echo signal. It may represent, for example, some of subscriber E's signal which is eventually returned by way of hybrid 11 at station W to E. Moreover, the subscriber circuits, e.g., circuits 10 and 20, may represent additional switched links which terminate in one or more hybrid systems, each of which produces additional echo. These echo components also affect, through mismatch, the operational efficiency of the hybrid, thus to permit incoming currents to reach the outgoing circuit.

Hybrid inefficiency, characterized primarily by trans-hybrid loss, is improved in accordance with the present invention by measuring the loss and using the measurement to adjust a balancing network which bridges the hybrid network. In FIG. 1, for example, balancing network 17 is connected essentially in shunt with hybrid network 11 by way of combining network 15. Balancing network 17 is adjusted periodically to exhibit a transfer characteristic substantially identical to that of hybrid 11. Consequently, incoming signals on circuit 13 which pass through hybrid 11 and reach circuit 12 are cancelled by subtracting from the signals in circuit 12 an identical signal produced as incoming signals are passed through network 17. Network 17, in turn, is adjusted in response to an interrogation pulse produced by network 18, preferably during periods of silence in circuit 13. The interrogation pulse is delivered by way of circuit 13 to hybrid 11 and, depending on the trans-hybrid characteristic, also to circuit 12. It therefore experiences the transformation characteristic of the trans-hybrid path, and appears in its modified, i.e., filtered form, at the output of combining network 15. (Bridging network 17 supplies no signal to network 15 during interrogation.) The modified pulse is thereupon returned to network 17 and used to adjust it in accordance with the trans-hybrid characteristic.

The manner in which the necessary adjustments of balancing network 17 are made is illustrated in the exemplary block diagram of FIG. 2. The block diagram illustrates generally the apparatus associated with the east station of FIG. 1.

The signal component necessary for canceling the echo signal which reaches outgoing circuit 22, as a result of trans-hybrid loss associated with hybrid network 21, is developed in a transversal filter system including tapped delay line 31, gain adjusting devices such as modulators $32_1$, $32_2$ . . . $32_n$, and combining network 33. Once the gains and polarities of the several tapped signals are adjusted, incoming signals passed by way of adjustable delay 30 to the transversal filter system are supplied by way of switch 34 to subtractor 25. Consequently, a signal which closely approximates the one that reaches the outgoing circuit, as an echo, is cancelled without, however, interrupting the free flow of signal information originating at the local station.

In order to adjust the transversal filter system appropriately it is, of course, necessary that the transhybrid characteristic of network 21 be known. In accordance with the invention, this characteristic is periodically measured, for example, by measuring the impulse response of the path through the hybrid.

Although the impulse response may be measured in a number of ways, it has been found preferable to apply a brief interrogation pulse to the system during intervals devoid of speech. The use of an independent interrogation pulse as opposed, for example, to the use of a speech signal, has a number of advantages. Simplified implementation of the system is foremost among these.

Silent intervals in the incoming speech train are detected by conventional speech detector 36 connected in the incoming circuit 23. Speech detector 36 preferably is adjusted by way of a threshold adjustment or the like to respond only to intervals of silence of a predetermined duration and predetermined level below some fixed datum. Circuits with the requisite characteristics are well known in the art. The indication of a suitable silent interval is converted in trigger network 37 into a suitable pulse which may be further shaped in pulser 38 and returned to incoming circuit 23. The pulse thereupon passes through the circuit 23, and through hybrid network 21. A portion of it may appear as an "echo" in outgoing circuit 22. If it does, it is applied to the input of a tapped delay line 39 and to threshold network 40. Network 40 is also supplied with an interrogation pulse from pulser 38. This pulse acts as a timing pulse to enable threshold network 40 to measure the overall delay D associated with the transmission path. Thus, network 40 measures the interval between the application of the interrogation pulse from pulser 38 to circuit 23 and the application of the transmitted pulse to delay line 39. The resultant measure is employed to generate a signal which adjusts the interval of delay line units 30 and 41. Delay unit 41 is also provided with a nonadjustable fixed delay equal to the total delay of line 39, i.e., equal to an interval $\tau$. Thus, delay unit 41 is adjusted by the signal issuing from threshold network 40 to exhibit a total delay of $D+\tau$.

The electrical length of delay line 39 is selected to accommodate a time interval $\tau$ commensurate with the response of the hybrid system to an interrogation impulse. Thus, at time $D+\tau$, the interrogation pulse issued from pulser 38 is stored in delay line 39. Samples of the pulse taken at Nyquist intervals therefore provide a time domain representation of the pulse.

At this instant, $D+\tau$, the signal produced by delay unit 41 simultaneously actuates sample-and-hold networks $42_1$, $42_2$ . . . $42_n$. Brief samples taken at Nyquist intervals, and representing the impulse response of the hybrid system, are held sufficiently to permit gain adjusting modulators $32_1$, $32_2$ . . . $32_n$ to be adjusted correspondingly. Since the gain adjusting elements 32 are associated with the transversal filter system, including delay line 31, the transversal system as adjusted exhibits the measured impulse response of the hybrid system. Signals reaching delay line 31 from incoming circuit 23 therefore pass through a system which exhibits an impulse response identical to that of the hybrid system. Adjustable delay 30 compensates for delay D as discussed above.

Once the interrogation process has been completed, and the transversal filter bridging hybrid 21 has been adjusted, incoming signals which reach the hybrid are also passed through the transversal filter. Combined signals from adder 33 are thereupon delivered by way of switch 34 to the subtract input of subtractor 25. Since these signals exhibit a characteristic identical to echo signals which passed from the incoming circuit to the outgoing circuit because of hybrid inefficiencies, the subtraction effectively cancels the signals from the outgoing transmission channel.

In order to avoid the unnecessary adjustment of modulators 32 during the interrogation process, it is preferable to open the bridging network circuit during interrogation, for example, by opening switch 34. Switch 34 may be controlled conveniently by means of a pulse issuing from threshold network 40. This signal, which occurs at time D, is passed through delay line unit 44 which is adjusted to exhibit a delay interval of $\tau$ plus sufficient additional delay, $\Delta$, to compensate for the reaction time of sample-and-hold networks 42 and modulators 32. Thus, as soon as modulators 32 have been suitably adjusted in response to an interrogation pulse, switch 34 closes and remains closed to complete the bridging network circuit. Switch 34 is opened upon receipt of the next interrogation pulse from pulser 38. Alternatively, switch control 45 may be actuated by the pulse issuing from delay unit 41. Again, a slight additional delay should be used to permit circuit stabilization.

To avoid unnecessarily loading delay line 39 in the event that signals from circuit 20 are outgoing in circuit 22, it may be desirable to employ another speech detector, 46, to produce control signals whenever signals in circuit 22 exceed a prescribed level or duration. These control signals may be used to open normally closed switch 47, (connected to detector 46 via a circuit interconnecting point *a*), thus to prevent samples of the delay line signal to be taken during such periods of speech.

Although a separate interrogation pulse applied to the system during silent intervals is preferred, it will be apparent to those skilled in the art that other techniques may be employed for measuring the impulse response of the hybrid system. Speech signals themselves may be employed or auxiliary pulses applied briefly during speech intervals may be used. Similarly, in place of the automatic speech detector, it may be in some circumstances sufficient to utilize a manual switch or the like, i.e., to initiate interrogation only at desired times. Further, it may be desirable to store the measured impulse response of the system for prolonged periods so that the bridging network may be reset to any desired characteristic. Thus, sample-and-hold networks 42 may "hold" time domain samples of the interrogation pulse for extended periods, e.g., in any conventional storage mechanism.

The above-described arrangements are of course merely illustrative of the application of the principles of the invention. In particular, it is apparent that the echo canceller is suitable for use at any point in a two-way circuit; it need not be located physically close to a hybrid terminating junction. Numerous other arrangements may be devised by those skilled in the art without, however, departing from the spirit and the scope of the invention.

What is claimed is:

1. An adaptive echo canceller which comprises,
- means for measuring the impulse response of a terminal interconnecting two one-way signal circuits with at least one two-way circuit,
- a signal processing network including a first transversal filter,
- controllable second transversal filter means supplied with signals from the one-way circuit incoming to said terminal for adjusting said processing network to approximate the impulse response of said terminal,
- means for selectively supplying signals from the one-way circuit incoming to said terminal to said network, and
- means for differentially combining signals from said network with signals in the one-way path outgoing from said terminal.

2. An adaptive echo canceller as defined in claim 1 wherein, said controllable means for adjusting said network is actuated at prescribed instants only.

3. An adaptive echo canceller as defined in claim 1 wherein, said controllable means for adjusting said network is actuated in intervals devoid of signals in said one-way circuit incoming to said junction.

4. An adaptive echo canceller as defined in claim 1 wherein,
- said signal processing network comprises,
- a tapped delay line,
- means for adjusting the gain of signals developed at the taps of said delay line, and
- means for selectively combining said adjusted tap signals.

5. An echo canceller which comprises, in combination,
- means for measuring the transfer characteristic of a terminal interconnecting two one-way signal circuits with at least one two-way circuit,
- said means including a first transversal filter selectively supplied with signals in the one-way circuit outgoing from said terminal,
- means for selectively supplying a brief signal pulse to the one-way signal circuit incoming to said terminal,
- means for selectively sampling signals developed by said first transversal filter,
- a signal processing network supplied with signals in said one-way circuit incoming to said terminal,
- said signal processing network including a second transversal filter system,
- a differential signal network,
- means, for selectively supplying signals from said signal processing network and signals in said one-way signal circuit outgoing from said terminal to said differential network, and
- means for employing said samples for adjusting said second transversal filter of said signal processing network.

6. An echo canceller as defined in claim 5 wherein, said means for selectively supplying a brief pulse to said incoming circuit comprises,
- a speech detector supplied with signals from said incoming circuit, and
- means for developing a brief pulsive signal for detected silent intervals of a prescribed level and duration in said incoming circuit.

7. An echo canceller as defined in claim 5 wherein, said means for selectively sampling signals developed by said first transversal filter is actuated only at a prescribed time following the delivery of one of said brief pulses to said incoming circuit.

8. An echo canceller as defined in claim 5 wherein, signals from said signal processing network are supplied to said differential network only after said signal processing network has been adjusted in response to samples developed by said measuring means.

9. An echo canceller as defined in claim 5 wherein, said means for selectively sampling signals developed by said first transversal filter is actuated only in the absence of signals of a prescribed level or duration in said outgoing one-way circuit.

References Cited

UNITED STATES PATENTS

| | | | |
|---|---|---|---|
| 2,990,457 | 6/1961 | Hall et al. | |
| 2,825,764 | 3/1958 | Edwards et al. | |
| 3,465,106 | 9/1969 | Nagata et al. | 179—170.2 |

FOREIGN PATENTS

| | | |
|---|---|---|
| 19,353 | 6/1957 | Japan. |

KATHLEEN H. CLAFFY, Primary Examiner

W. A. HELVESTINE, Assistant Examiner